United States Patent
Batenburg et al.

(10) Patent No.: US 11,324,244 B2
(45) Date of Patent: May 10, 2022

(54) POTATO DERIVED FLAVOUR ENHANCING COMPOSITION AND METHOD FOR THE MANUFACTURE THEREOF

(71) Applicant: Conopco, Inc., Englewood Cliffs, NJ (US)

(72) Inventors: Amir Maximiliaan Batenburg, Maassluis (NL); Alphonsus Henricus L Cambeen, Breda (NL); Teun De Joode, Essen (BE)

(73) Assignee: Conopco Inc., Englewood Cliffs, NJ (US)

( * ) Notice: Subject to any disclaimer, the term of this patent is extended or adjusted under 35 U.S.C. 154(b) by 591 days.

(21) Appl. No.: 14/899,617

(22) PCT Filed: Feb. 27, 2014

(86) PCT No.: PCT/EP2014/053804
§ 371 (c)(1),
(2) Date: Dec. 18, 2015

(87) PCT Pub. No.: WO2015/000606
PCT Pub. Date: Jan. 8, 2015

(65) Prior Publication Data
US 2016/0135489 A1   May 19, 2016

(30) Foreign Application Priority Data
Jul. 3, 2013   (EP) ..................... 13174886

(51) Int. Cl.
| | | |
|---|---|---|
| *A23L 19/18* | (2016.01) | |
| *A23L 27/00* | (2016.01) | |
| *A23L 27/22* | (2016.01) | |
| *A23L 23/10* | (2016.01) | |
| *A23L 27/10* | (2016.01) | |
| *A23L 27/21* | (2016.01) | |

(52) U.S. Cl.
CPC ............ *A23L 19/18* (2016.08); *A23L 23/10* (2016.08); *A23L 27/10* (2016.08); *A23L 27/21* (2016.08); *A23L 27/22* (2016.08); *A23L 27/88* (2016.08); *A23V 2002/00* (2013.01)

(58) Field of Classification Search
None
See application file for complete search history.

(56) References Cited

U.S. PATENT DOCUMENTS

| | | | |
|---|---|---|---|
| 2,535,117 A | 12/1950 | Bennett | |
| 6,951,658 B1* | 10/2005 | Pearson | A61K 9/0019 424/283.1 |
| 8,828,462 B2 | 9/2014 | Cheng et al. | |
| 2001/0041199 A1 | 11/2001 | Davids | |
| 2005/0118235 A1* | 6/2005 | Yu | A61K 31/195 424/442 |
| 2008/0292649 A1* | 11/2008 | Hageman | A61K 31/185 424/184.1 |
| 2009/0221502 A1* | 9/2009 | Yatcilla | A61K 31/198 514/6.9 |
| 2010/0092649 A1* | 4/2010 | Tsuchiya | A61K 31/198 426/589 |

(Continued)

FOREIGN PATENT DOCUMENTS

| | | |
|---|---|---|
| CN | 101683136 | 3/2010 |
| CN | 102845710 | 1/2013 |
| JP | 03239701 | 10/1991 |

(Continued)

OTHER PUBLICATIONS

Koenig: Nutritional compositions having reduced sodium content and methods for making same; WO2012135126; published Oct. 4, 2012. (Year: 2012).*
Haipeng: CN 201110189284 A, published May 8, 2013. (Year: 2013).*
Paltzer: CA 2700454; published Sep. 30, 2010. (Year: 2010).*
Yatcilla: Derwent-ACC-No. 2009-N20541 of 2009/0221502, published Sep. 3, 2009. (Year: 2009).*
Morris et al, Umami compounds are a determinant of the flavor of potato (*Solanum tuberosum* L), J Agric Food Chem, Oct. 19, 2007, pp. 9627-9633, 55.
Davids et al, Effect of thermal treatment of incubated potato juice on the formation of Maillard volatiles, Intl Journal of Food Sc & Tech, Apr. 28, 2003, pp. 849-856, v. 38, No. 8, CA (NPL, pp. 1-8).
Davids et al, Use of unusual storage temperatures to improve the amino acid profile of potatoes for novel flavoring applications, Lebensmittel-Wissenschaft und-Technologie, Jan. 30, 2004, pp. 619-626, v. 37, No. 6, CA (NPL, pp. 9-16).

(Continued)

*Primary Examiner* — Patricia A George
(74) *Attorney, Agent, or Firm* — N.V. Nederlandsch Octrooibureau

(57) ABSTRACT

The present invention relates to a potato derived flavour enhancing composition having a dry matter content of at least 3 wt. % and containing per kg of dry matter: •150-900 g of proteinaceous matter; •0-100 g of starch; •0-5 mg of chlorogenic acid; •0-30 mg of glycoalkaloid selected from α-solanine, α-chaconine and combinations thereof; wherein free amino acids represent at least 80 wt. % of the proteinaceous matter, said free amino acids comprising: •a first group of free amino acids selected from asparagine (Asn), aspartate (Asp), glutamate (Glu), glutamine (Gln), pyroglutamate (pGlu) and combinations thereof, said first group of free amino acids representing 45-95 wt. % of the free amino acids; •a second group of free amino acids selected from glycine (Gly), leucine (Leu), lysine (Lys), serine (Ser), isoleucine (Ile) and combinations thereof, said second group of free amino acids representing 1-20 wt. % of the free amino acids; •at least 3.5 wt. % Glu; wherein the first group of free amino acids and the second group of free amino acids are present in a weight ratio of at least 4:1. The flavour enhancing composition according to the present invention is obtained by removing most of the starch and protein naturally present in potato, by additionally removing the bulk of glycoalkaloids (α-solanine, α-chaconine) that are endogenous to potato, and by retaining flavour enhancing components, including glutamate.

16 Claims, No Drawings

(56) References Cited

U.S. PATENT DOCUMENTS

2012/0288587 A1    11/2012    Cheng et al.
2013/0059928 A1*   3/2013    Dhalleine ................ A23J 3/14
                                                             514/773

FOREIGN PATENT DOCUMENTS

| WO | WO2008069651 | 6/2008 |
| WO | WO2010069743 | 6/2010 |
| WO | WO2012072399 | 6/2012 |
| WO | WO2013092296 | 6/2013 |

OTHER PUBLICATIONS

Heisler et al., Recovery of Free Amino Compounds from Potato Starch Processing Water by Use of Ion Exchange, American Potato Journal, 1959, pp. 1-11, vol. 36 No 1 (NPL, pp. 17-27).

Joseph et al., Glutamic Acid Fermentation Employing Starch Tubers as Raw Materia, J Food Sci Tech, May 2, 1973, pp. 160-164, v. 10 No. 4, US (NPL, pp. 28-32).

Search Report in EP13174886, dated Dec. 19, 2013 (NPL, pp. 33-35).

Search Report in PCTEP2014053804, dated Apr. 22, 2014 (NPL, pp. 36-39).

Wayne L Morris et al, Umami compounds are a derterminant of the flavor of potato (*Solanum tuberosum* L.), Journal of agricultural and food chemistry, Nov. 1, 2007, 9627-9633, 55 No. 23 (NPL, pp. 40-46).

Written Opinion in EP13174886, dated Dec. 14, 2013 (NPL, pp. 47).

Written Opinion in PCTEP2014053804, dated Apr. 22, 2014 (NPL, pp. 48-52).

* cited by examiner

POTATO DERIVED FLAVOUR ENHANCING COMPOSITION AND METHOD FOR THE MANUFACTURE THEREOF

TECHNICAL FIELD OF THE INVENTION

The present invention relates to a potato derived flavour enhancing composition, more particularly a potato derived flavour enhancing composition that contains a considerable amount of glutamate.

The invention further concerns a process of preparing an edible product by combining the aforementioned flavour enhancing composition with one or more other edible ingredients and to an edible product so obtained.

The invention also provides a method of preparing the flavour enhancing composition starting from potatoes.

BACKGROUND OF THE INVENTION

Umami is one of the five basic tastes together with sweet, sour, bitter, and salty. Umami is a loanword from the Japanese meaning "pleasant savory taste".

For a long time, scientists debated whether umami was indeed a basic taste; but in 1985 at the first Umami International Symposium in Hawaii, the term Umami was officially recognized as the scientific term to describe the taste of glutamates and nucleotides. Now it is widely accepted as the fifth basic taste. Umami represents the taste of the amino acid L-glutamate and 5'-ribonucleotides such as 5'guanosine monophosphate (5'GMP) and 5'inosine monophosphate (5'IMP). It is described as a pleasant "brothy" or "meaty" taste with a long lasting, mouthwatering and coating sensation over the tongue. Its fundamental effect is the ability to balance taste and round off the total flavor of a dish. This ability is often referred to as "flavour enhancement".

Umami was not properly identified until 1908 by the scientist Kikunae Ikeda. He found that glutamate was responsible for the palatability of the broth from kombu seaweed. He noticed that the taste of kombu dashi was distinct from sweet, sour, bitter and salty and named it umami. Ikeda subsequently patented a process for the industrial production of the monosodium glutamate salt (MSG), which led to the foundation of the Ajinomoto company, who commercialized and popularized MSG.

Later, a disciple of professor Ikeda, Shintaro Kodama, discovered in 1913 that dried bonito flakes contained another umami substance. This was the ribonucleotide 5'IMP. In 1957, Akira Kuninaka realized that the ribonucleotide 5'GMP present in shiitake mushrooms also conferred the umami taste. One of Kuninaka's most important discoveries was the synergistic effect between ribonucleotides and glutamate. When foods rich in glutamate are combined with ingredients that have ribonucleotides, the resulting taste intensity is higher than the sum of both ingredients.

Many foodstuffs that may be consumed daily are rich in umami. Naturally occurring glutamate can be found in meats and vegetables. 5'IMP comes primarily from meats and fish and 5'GMP from fruit and vegetables. Thus, umami taste is common to foods that contain high levels of L-glutamate, 5'IMP and 5'GMP, most notably in fish, shellfish, cured meats, vegetables (e.g. mushrooms, ripe tomatoes, Chinese cabbage, spinach, etc.) green tea, and fermented and aged products (e.g. cheeses, shrimp pastes, soy sauce, etc.).

In order to enhance the flavour of foodstuffs it is well-known to add monosodium glutamate (MSG), 5'IMP and 5'GMP. Yeast extracts and hydrolyzed protein are also widely used for this purpose.

It is known to produce a flavour enhancing composition from plant materials that are rich in glutamate. WO 2010/069743, for instance, describes the isolation of an umami enhancing composition from tomato serum.

It is also known to prepare flavouring compositions starting from potatoes. US 2001/041199 describes a process for the manufacture of at least one ingredient having a food and/or beverage application using potatoes as starting material, said process comprising the steps of:

a) cutting washed raw potatoes and dipping the so-cut potatoes in an anti-oxidant solution;

b) mechanically disintegrating the cut and dipped potatoes obtained in step a) to obtain a starch-containing juice and fibers, separating the fibers from the starch-containing juice, and processing the starch-containing juice to extract the juice from the starch, said starch being in a non-gelatinized form;

c) subjecting the so-extracted juice to a slow evaporation with or without simultaneous addition of extra enzymes to produce small proteins and free amino acids from proteins contained in the juice;

d) heating the juice obtained in step c) to precipitate soluble proteins and to destroy enzymes contained in it, and separating by filtration the precipitated proteins from the juice to obtain a protein isolate and a filtered juice;

e) optionally further heating a portion of the filtered juice obtained in step d) to a temperature high enough to cause a Maillard browning reaction;

f) adjusting the pH of the juice(s) obtained in step d) and/or in optional step e) and, when a portion of the juice has been subjected to the heating in step e), blending said portion of the juice with the remainder of the juice obtained in step d) in a preselected ratio; and g) recovering the juice obtained in step f) which:
   when all the filtered juice obtained in step d) has been subjected to the further heating of step e), is useful to make a caffeine-free coffee substitute;
   when none of the filtered juice obtained in step d) has been subjected to the further heating of step e), is useful as a hydrolyzed vegetable protein substitute; and
   when a portion only of the filtered juice obtained in step d) has been subjected to the further heating of step e) and said portion has been blended with the remainder of the juice obtained in step d), is useful to make a fermentable wort to produce a malt-free beer.

Example 5 of US 2001/041199 describes a process in which starch is removed from starch-laden potato using a Buchner funnel fitted with a nylon mesh overlayed with polyester cloth. The turbid juice so obtained was warmed to 52° C., brought to pH 4.8 with hydrochloric acid and drawn through a sterile polypropylene hollow fibre microfilter. Flavourzyme® and Enzeco glutaminase were added to the juice which was incubated for 48 hours after which the juice was heated to 100° C. for several minutes. The yellow clear juice obtained had a pH of 5.2 and a reducing sugar concentration of about 2%. Glutamic acid made up 11% of the total free amino acids. The dried masses of the precipitated protein, fibre and starch were 29 g, 1.14 kg, and 1.78 kg respectively. The pH of the juice was adjusted to 6.0 with NaOH and the juice was freeze-dried and then vacuum dried. The resulting dried juice weighing 143 g was finely powdered with 50 g of sodium chloride. The beige-coloured powder had an HVP taste with a subtle french-fry flavour.

S. J Davids et al. (*Effect of thermal treatment of incubated potato juice on the formation of maillard volatiles*, International Journal of Food Science and Technology, Vol. 38, No. 8 (2003), pp. 849-856) investigated the juice of potato as a medium for flavour development. Potato juice samples, obtained from potatoes stored at different temps. (0-24° C.) and times (8-20 wk), were incubated (45-57° C. for 42 h) with or without com. proteases. The samples were then used for thermal browning experiments. Analyses indicated that, by subjecting the potato juice to thermal treatments, a wide variety of volatiles generated by the Maillard reaction were produced. The authors conclude that these findings suggest that the study of potato juice ext. as a new medium for flavor development, in particular in those applications which presently use malt, coffee, soybean, meat and yeast exts., is a worthwhile endeavor.

S. J. Davids et al. (*Use of unusual storage temperatures to improve the amino acid profile of potatoes for novel flavoring applications*, Lebensmittel-Wissenschaft und—Technologie, Vol. 37, No. 6 (2004), pp. 619-626) investigated the potential of potato culls as a source of novel flavorings. Free amino acid profiles of juice from tubers stored at 0° C., 12° C. or 24° C. were analyzed. Juices were also incubated for 42 h with or without protease for comparison. Storage at all three temperatures increased glutamine concentration. The relative percentages of asparagine and glutamine decreased while several other amino acids increased in the juice of potatoes stored at 0° C. and 24° C. Small shifts in free amino acid profile, increasing alanine, valine, aspartic acid, asparagine and arginine levels, were obtained by incubating juice from potatoes stored at 0° C. without added protease while the protease produced substantial increases but with emphasis on leucine and isoleucine and phenylalanine, which increased bitterness. The authors conclude that since storage alone increased the concentration of single amino acids such as alanine, methionine and phenylalanine by several fold, it may be the preferred means of improving potato culls for novel flavor applications where bitterness must be minimized.

Heisler et al. (*Recovery of free amino compounds from potato starch processing water by use of ion exchange*, American Potato Journal (1959), 36(1), pp 1-11) describes a process for the recovery of free amino compounds from 'protein water' that was discharged from potato starch factories. Deproteinized potato liquor was passed through a column filled with cation exchange resin ($H^+$ form). Next, the column was eluted with ammonium hydroxide solution and fractions were collected. The authors note that the middle fractions contained a mixture of glutamic acid, asparagine and glutamine and that these fractions were rich in gamma-aminobutyric acid and valine. The authors observe that a concentrated mixture of the principal amino compounds, in addition to potential pharmaceutical uses, might also be of value as a nutritional supplement, food flavoring agent or nutrient in industrial fermentations.

JP 03/239,701 describes a method for decolourisation and deodorisation of potato juice wherein a deproteinated liquid prepared by removal of protein from a concentrated juice separated from ground milky liquid of potato in a step for the manufacture of potato starch is successively treated with anion exchange resin and activated charcoal. Example 1 describes the composition of a thus treated liquid. It is observed in the Japanese patent application that the colourless, transparent liquid obtained by the aforementioned treatment is without smell and can be used as a seasoning material.

It is further known that umami compounds contribute to the flavour of potato. Morris et al. (*Umami compounds are a determinant of the flavor of potato (Solanum tuberosum L.)*, Journal of Agricultural and Food Chemistry; Vol. 55 no. 23, (2007), pp. 9627-33) describe the results of a study in which they assessed the levels of the major umami compounds in boiled potato tubers, in cultivars previously assessed for sensory quality. The free levels of the major umami amino acids, glutamate and aspartate, and the 5'-nucleotides, GMP and AMP, were measured in potato samples during the cooking process. Tubers were sampled at several time points during the growing season. The levels of both glutamate and 5'-nucleotides were significantly higher in mature tubers of two *Solanum phureja* cultivars compared with two *Solanum tuberosum* cultivars. The equivalent umami concentration was calculated for five cultivars, and there were strong positive correlations with flavor attributes and acceptability scores from a trained evaluation panel, suggesting that umami is an important component of potato flavor.

WO 2008/069651 describes a process for removing glycoalkaloids from an aqueous solution of a vegetable protein comprising contacting the solution with an activated carbon for a period effective to adsorb the glycoalkaloids, and separating the activated carbon from the solution to obtain a substantially glycoalkaloid-free aqueous solution of vegetable protein. The examples of the international patent application describe treatment of patatin eluate with activated carbon.

Approximate levels of potato tuber components are shown in the following table (taken from Shelly H. Jansky, Chapter 48, *Potato Flavor*, Handbook of Fruit and Vegetable Flavors, (2010) John Wiley & Sons, Inc).

| | Compound percent fresh weight |
|---|---|
| Starch | 18.0 |
| Protein | 2.0 |
| Fiber (suberin, lignin) | 1.3 |
| Sugars (glucose, fructose, and sucrose) | 1.0 |
| Minerals (K, Mg, Ca, P, Na) | 1.0 |
| Free amino acids | 0.8 |
| Non-starch polysaccharides (hemicelluloses and pectins) | 0.7 |
| Organic acids (citric, oxalic, malic, and chlorogenic) | 0.2 |
| Lipids (fatty acids include linoleic, linolenic, and palmitic) | 0.1 |
| Pigments (anthocyanins and carotenoids) | 0.01 |
| Glycoalkaloids (solanine and chaconine) | 0.01 |
| Nucleotides, RNA | 0.01 |

SUMMARY OF THE INVENTION

The inventors have developed a potato-derived flavour enhancing composition that contains a substantial amount of glutamate. The flavour enhancing composition according to the present invention is obtained by removing most of the starch and protein naturally present in potato, by additionally removing the bulk of glycoalkaloids ($\alpha$-solanine, $\alpha$-chaconine) that are endogenous to potato, and by retaining flavour enhancing components, including glutamate.

The free amino acid profile of the flavour enhancing composition is similar to the free amino acid profile found in freshly harvested potatoes. The main free amino acids are asparagine (Asn), aspartate (Asp), glutamate (Glu), glutamine (Gln) and pyroglutamate (pGlu).

The aforementioned free amino acid profile is very different from the amino acid composition of potato protein. Amino acids that are overrepresented in potato protein relative to their free amino acid counterparts are glycine (Gly), leucine (Leu), lysine (Lys), serine (Ser) and isoleucine (Ile)

Thus, one aspect of the invention relates to potato derived flavour enhancing composition having a dry matter content of at least 3 wt. % and containing per kg of dry matter:
- 150-900 g of proteinaceous matter selected from amino acids, oligopeptides, polypeptides and combinations thereof;
- 0-100 g of starch;
- 0-300 g of non-starch polysaccharides;
- 0-330 g of saccharides selected from fructose, glucose, sucrose and combinations thereof;
- 0.01-300 g of minerals selected from potassium, sodium, calcium, magnesium and combinations thereof;
- 0-5 mg of chlorogenic acid;
- 0-30 mg of glycoalkaloid selected from α-solanine, α-chaconine and combinations thereof;

wherein free amino acids represent at least 80 wt. % of the proteinaceous matter, said free amino acids comprising:
- a first group of free amino acids selected from asparagine (Asn), aspartate (Asp), glutamate (Glu), glutamine (Gln), pyroglutamate (pGlu) and combinations thereof, said first group of free amino acids representing 45-95 wt. % of the free amino acids;
- a second group of free amino acids selected from glycine (Gly), leucine (Leu), lysine (Lys), serine (Ser), isoleucine (Ile) and combinations thereof, said second group of free amino acids representing 1-20 wt. % of the free amino acids;
- at least 3.5 wt. % Glu;

wherein the first group of free amino acids and the second group of free amino acids are present in a weight ratio of at least 4:1.

The flavour enhancing composition of the present invention offers the advantage that it is a natural ingredient that can be produced cost-effectively, e.g. from waste streams generated in industrial production of potato starch. Furthermore, the flavour enhancing composition can suitably be applied as a flavour enhancer in a wide range of edible products due to its neutral taste.

Another aspect of the invention relates to a process of preparing an edible product, said process comprising combining a flavour enhancing composition according to the present invention with one or more other edible ingredients to provide at least 50 mg of glutamate per kg of edible product.

A further aspect of the invention relates to an edible product obtained by the aforementioned process.

Yet another aspect of the invention relates to a method of preparing a flavour enhancing composition according to the present invention, said process comprising:
- mechanically disintegrating potatoes to produce a potato slurry;
- removing pulp and starch granules from the potato slurry to produce a potato fruit juice;
- removing protein from the potato fruit juice to produce a deproteinated juice;
- contacting the deproteinated juice with a hydrophobic adsorbent;
- separating the juice from the hydrophobic adsorbent; and
- optionally further processing the separated juice.

Treatment of the deproteinated juice with the hydrophobic adsorbent (e.g. activated charcoal) effectively removes the glycoalkaloid α-solanine, α-chaconine and substantially improves the flavour characteristics of the flavour enhancing composition.

DETAILED DESCRIPTION OF THE INVENTION

A first aspect of the invention concerns potato derived flavour enhancing composition having a dry matter content of at least 3 wt. % and containing per kg of dry matter:
- 150-900 g of proteinaceous matter selected from amino acids, oligopeptides, polypeptides and combinations thereof;
- 0-100 g of starch;
- 0-300 g of non-starch polysaccharides;
- 0-330 g of saccharides selected from fructose, glucose, sucrose and combinations thereof;
- 0.01-300 g of minerals selected from potassium, sodium, calcium, magnesium and combinations thereof;
- 0-5 mg of chlorogenic acid;
- 0-30 mg of glycoalkaloid selected from α-solanine, α-chaconine and combinations thereof;

wherein free amino acids represent at least 80 wt. % of the proteinaceous matter, said free amino acids comprising:
- a first group of free amino acids selected from asparagine (Asn), aspartate (Asp), glutamate (Glu), glutamine (Gln), pyroglutamate (pGlu) and combinations thereof, said first group of free amino acids representing 45-95 wt. % of the free amino acids;
- a second group of free amino acids selected from glycine (Gly), leucine (Leu), lysine (Lys), serine (Ser), isoleucine (Ile) and combinations thereof, said second group of free amino acids representing 1-20 wt. % of the free amino acids;
- at least 3.5 wt. % Glu;

wherein the first group of free amino acids and the second group of free amino acids are present in a weight ratio of at least 4:1.

The term "potato" as used herein refers to the tuber of the potato plant (e.g. *Solanum tuberosum*).

The term "amino acid" as used herein, unless indicated otherwise refers to free amino acids and also encompasses salts of these free amino acids.

The term "glutamate" or "Glu", unless indicated otherwise, encompasses the free amino acid as well as salts thereof. Unless indicated otherwise, the same holds for other amino acids.

The term "oligopeptides" as used herein refers to polymers of 2 to 20 amino acids joined via peptide bonds.

The term "polypeptides" as used herein refers to polymers of more than 20 amino acids joined via peptide bonds.

The term "pyroglutamate" or "pGlu", also known as 5-oxoproline or pidolic acid or 5-Oxopyrrolidine-2-carboxylic acid, refers to an amino acid derivative of Glu or Gln in which the free amino group has cyclized to form a lactam. This kind of cyclization can occur when potatoes are processed to produce the flavour enhancing composition of the present invention.

The term "polysaccharides" as used herein refers to linear and branched polymers of more than 30 monosaccharide units joined via glycosidic bonds.

The term "non-starch polysaccharides" refers to polysaccharides other than starch.

The term "chlorogenic acid" as used herein refers to the ester of caffeic acid and L-quinic acid with IUPAC name: (1S,3R,4R,5R)-3-{[(2Z)-3-(3,4-dihydroxyphenyl)prop-2-enoyl]oxy}-1,4,5-trihydroxycyclohexanecarboxylic acid, as well as salts of this acid.

The flavour enhancing composition of the present invention preferably has a glutamate (Glu) content of at least 1%, more preferably of 1.5-60% and most preferably of 2-50% by weight of dry matter.

Expressed differently, the glutamate content preferably is at least 3.7%, more preferably at least 4%, even more preferably at least 5% and most preferably at least 6% by weight of the proteinaceous matter.

Glutamate typically represents at least 4 wt. %, more preferably at least 5 wt. %, even more preferably 6-80 wt. % and most preferably 7-60 wt. % of the free amino acids contained in the flavour enhancing composition.

The flavour enhancing composition of the present invention is preferably obtained by an isolation process that commences shortly after grating of the potatoes and that employs minimal thermal treatment. Thus, it is possible to produce a flavour enhancing composition without having to utilize sophisticated separation techniques, such as ion exchange chromatography. Also the rapid processing of grated potatoes under mild conditions minimizes conversion of glutamine to pyroglutamate, thereby preserving glutamine as a substrate that can be enzymatically converted to glutamate with the help of glutaminase. Therefore, in accordance with a particularly preferred embodiment of the invention, pyroglumate (pGlu) represents not more than 18%, more preferably not more than 15% and most preferably not more than 12% of the total amount of free amino acids contained in the flavour enhancing composition.

The present composition may contain a significant amount of chlorogenic acid, an ester of caffeic acid and L-quinic acid that is naturally present in potato. Typically, the composition contains not more than a limited amount of chlorogenic acid, e.g. not more than 5 mg of chlorogenic acid per kg of dry matter. Even more preferably, the chlorogenic acid content does not exceed 3 mg per kg of dry matter.

Advantageously, the level of glycoalkaloid (the combined amount of α-solanine and α-chaconine) in the potato derived flavour enhancing composition is substantially reduced relative to glutamate level. Typically, the flavour enhancing composition contains less than 1 mg glycoalkaloid per g of glutamate. More preferably, the composition contains less than 0.5 mg glycoalkaloid per g of glutamate. Most preferably, it contains less than 0.3 mg glycoalkaloid per g of glutamate.

The flavour enhancing composition of the present invention preferably is produced by a process that involves removal of most of the protein (oligopeptides and polypeptides) from the potato starting material. Furthermore, this process preferably does not involve a protein hydrolysis step. Consequently, peptides comprising 2-20 amino acid residues preferably represent less than 3%, more preferably less than 2% and most preferably less than 1% by weight of the proteinaceous matter.

Hydrolysis of potato protein typically causes an increase in amino acids belonging to the second group of free amino acid (Gly, Leu, Lys, Ser, Ilel). The flavour enhancing composition of the invention typically contains less than 18%, more preferably less than 16% and most preferably less than 15% of amino acid belonging to the second group of free amino acids, all percentages being calculated by weight of the total amount of free amino acids.

The first group of free amino acids (Asn, Asp, Glu, Gln, pGlu) preferably represents at least 50%, more preferably at least 55% and most preferably at least 60% by weight of the total amount of free amino acids.

The first group of free amino acids and the second group of free amino acids are preferably contained in the flavour enhancing composition in a weight ratio of at least 9:2, more preferably of at least 5:1, most preferably of at least 6:1

Typically, the ratio ([Glu]+[Gln]+[pGlu])/([Asp]+[Asn]) of the potato-derived flavour enhancing composition is in the range of 1:4 to 3:1. More preferably, the latter ratio is in the range of 1:3 to 2.5:1, most preferably in the range of 1:2 to 2:1.

The free amino acids serine (Ser), proline (Pro), threonine (Thr) and tyrosine (Tyr) typically represents at least 1%, more preferably at least 2% and most preferably at least 4% of the total amount of free amino acids that is contained in the potato derived flavour enhancing composition.

The free amino acid tyrosine is easily oxidized by polyphenol oxidase that is naturally present in potato. Low levels of tyrosine in the flavour enhancing composition are an indication that the potatoes have not been processed quickly after grating. Consequently, in accordance with another preferred embodiment, tyrosine (Tyr) is present in the flavour enhancing composition in a concentration of at least 0.2%, more preferably of at least 0.4% and most preferably of at least 0.5% by weight of the total amount of free amino acids.

The phosphor content of the flavour enhancing composition normally lies in the range of 5-20,000 mg per kg of dry matter. Preferably the phosphor content lies in the range of 10-15,000 mg, most preferably 20-12,500 mg per kg of dry matter.

Due to the fact that the present flavour enhancing composition is derived from potatoes using a process that does not remove all of the potato RNA or potato DNA, the composition typically contains at least traces of these macromolecules.

The flavour enhancing composition can, for instance, take the form of a powder, a paste or a liquid. Most preferably, the flavour enhancing composition is a powder.

The dry matter content of the flavour enhancing composition preferably exceeds 5 wt. %, more preferably it exceeds 10 wt. %. Even more preferably, the dry matter content exceeds 30 wt. %, most preferably it exceeds 50 wt. %.

The amount of proteinaceous matter contained in the flavour enhancing composition typically lies in the range of 170-880 g per kg of dry matter, more preferably in the range of 190-850 kg of dry matter and most preferably in the range of 200-800 g per kg of dry matter.

The preferred concentration levels of other potato constituents are listed in the following tables.

| | Concentration in g per kg of dry matter | | |
|---|---|---|---|
| | Preferred | More preferred | Most preferred |
| Starch | <80 | <50 | <25 |
| Non-starch polysaccharides | <250 | <220 | <200 |
| Saccharides [1] | <300 | <250 | <230 |
| Minerals [2] | <300 | <250 | <200 |
| Glycoalkaloid [3] | <0.03 | <0.02 | <0.01 |

[1] selected from fructose, glucose, sucrose and combinations thereof
[2] selected from potassium, sodium, calcium, magnesium and combinations thereof
[3] selected from α-solanine, α-chaconine and combinations thereof Free amino acids typically represent at least 84 wt. %, more preferably at least 87 wt. % and most preferably at least 90 wt. % of the proteinaceous matter contained in the flavour enhancing composition.

The free amino acid Glu, Gln, pGlu, Asp, Asn together typically represent at least 50 wt. %, more preferably 55-98 wt. % and most preferably 60-95 wt. % of the free amino acids contained in the flavour enhancing composition.

Potato naturally contains a substantial amount of potassium. Typically, significant fraction of the potassium contained in the potato starting material is retained in the flavour enhancing composition of the present invention. Preferably, the flavour enhancing composition contains at least 0.5%, more preferably at least 2% and most preferably at least 4% potassium by weight of dry matter.

Calculated by weight of free amino acids, the flavour enhancing composition typically contains at least 3%, more preferably at least 10% and most preferably at least 20% potassium.

Another aspect of the invention relates to a process of preparing an edible product, said process comprising combining a flavour enhancing composition as defined herein before with one or more other edible ingredients to produce an edible product, wherein the flavour enhancing composition contributes at least 50 mg of glutamate per kg of edible product.

According to a preferred embodiment, the flavour enhancing composition is applied in the edible product in an amount that contributes 100-3,000 mg, more preferably 200-2,000 mg of glutamate per kg of edible product.

Typically, the flavour enhancing composition is applied in the edible product in a concentration that does not exceed 80% by weight of the total amount of dry matter that is contained in the edible product. Even more preferably the latter concentration lies within the range of 0.1-70%, most preferably 0.5-60% by weight of the dry matter contained in the edible product.

Examples of edible products in which the flavour enhancing composition may suitably be applied include condiments, sauces, soups, meat products, seasonings, bouillons and snacks. Preferably, the flavour enhancing composition is applied in an edible product selected from condiments, sauces, soups, meat products, seasonings and bouillons.

A further aspect of the invention relates to an edible product obtained by the aforementioned process.

Yet another aspect of the invention relates to a method of preparing a flavour enhancing composition as defined herein before, said process comprising:

- mechanically disintegrating potatoes to produce a potato slurry;
- removing pulp and starch granules from the potato slurry to produce a potato fruit juice;
- removing protein from the potato fruit juice to produce a deproteinated juice;
- contacting the deproteinated juice with a hydrophobic adsorbent;
- separating the juice from the hydrophobic adsorbent; and
- optionally, further processing the separated juice.

The juice obtained after separation of the hydrophobic adsorbent may suitably be further processed, e.g. to further increase the glutamate content. Further processing advantageously includes concentrating and/or drying in order to increase the dry matter content. Further processing may also suitably include purification to increase the glutamate content of the flavour enhancing composition.

In the present method the pulp and starch granules are suitably removed by sieving, filtration, sedimentation, decanting or centrifugation.

The protein is preferably removed by ultrafiltration, chromatography or by acid- and/or heat-denaturation followed by removal of insolubles. More preferably, the protein is removed by acid- and/or heat-denaturation, followed by removal of insolubles. The insolubles, are suitably removed by by sieving, filtration, sedimentation, decanting or centrifugation.

Examples of hydrophobic adsorbent that can be employed in the present method include activated carbon or macroreticular aromatic polymer resin and polyacrylate resins. Preferably, the hydrophobic adsorbent is activated carbon or macroreticular aromatic polymer resin. Most preferably, the hydrophobic adsorbent employed is activated carbon.

According to a preferred embodiment, the present method comprises a step in which a source of glutaminase is added to convert glutamine to glutamate. Conversion of glutamine to glutamate improves the flavour enhancing characteristics of the potato derived composition. Preferably this step is applied after protein has been removed from the potato fruit juice to produce a deproteinated juice.

Addition of the source of glutaminase in the present method typically increases the glutamate content with at least 50%, more preferably with at least 100%.

The invention is further illustrated by the following non-limiting examples.

EXAMPLES

Example 1

Two potato varieties, obtained from a local Dutch supermarket (Folva, unprocessed potatoes, and Belana, peeled potatoes packaged under a protective atmosphere) were used as a starting material.

10 kg of potatoes were peeled if required, grated using a kitchen food processor equipped with a grater disk, and subsequently ground with double-bladed knife for at least one minute at high speed. The potato slurry was filtered over a sintered glass funnel no. 2 under vacuum and the filtrate was boiled for at least 7 minutes in a pot. The precipitate formed during the heating was removed by a second filtration under vacuum, now using a Büchner funnel with a Whatman no. 595 filter paper. The filter cake was discarded and the filtrate was cooled with ice water.

To 1.8 kg of the second filtrate 0.2% glutaminase (SD-C100S from Amano) was added and the mixture was incubated for 30 minutes at 55° C. in a thermostated double-walled glass vessel. Subsequently the temperature of the solution was increased to 80° C., and kept at that temperature for 5 minutes to inactivate the enzyme and afterwards cooled with ice water. 1.3 kg of the second filtrate was subjected to the same temperature/time profile, but without addition of the enzyme preparation.

1% Norit™ CA-1 activated charcoal was added to both the enzyme-treated and non-enzyme-treated potato preparations and the mixtures were stirred overnight at 4° C. in a cooled cabinet. The activated charcoal was removed by filtration under vacuum over a Whatman no. 595 filter paper on a Büchner funnel. Smaller particles were removed by subsequent filtration over a 0.45 μm PES filtration funnel combined with a 500 ml bottle (art. No. 514-0300, ex VWR) and 0.2 μm PES Sterile Syringe Filter (PN 514-0073, ex VWR). The filtrates were recovered in sterilized jars, cooled down and stored frozen till further use. These filtrates can suitably be concentrated and dried, e.g. by spray drying, to yield a concentrated flavour enhancing composition.

The filtrates obtained were characterized by quantitative analysis of the free amino acids, chlorogenic acid, and the glycoalkaloids chaconin and alpha-solanine. Free amino acids were quantified via liquid chromatography on a cation exchange resin using Li-citrate buffers as mobile phase, with UV-detection after post column derivatisation with Ninhydrin at 570 or 440 nm (Spackman, D. H., Stein, W. H., and Moore, S. (1958) Analyt. Chem. 30, 1190). Glycoalkaloids were measured via LC-MS, used in positive and negative ion mode, respectively. For LC-MS an Agilent system 1200 series was used, including a 6320 Ion Trap MS, operated at a Cap-Exit voltage of +180V A Kinetex 2.6 μ C18 100A 100×4.6 mm column was used, run at 35° C. with a gradient of 5-80% acetonitril in 0.1% acetic acid. Chlorogenic acid was analysed using the same chromatographic conditions, but with UV detection at 320 nm. Calibration was performed with solutions of authentic compounds; solanine standards were also used for chaconine calibration, assuming a similar response of the M+1 parent ion. Other major components in the extracts were quantified by NMR. 1D $^1$H NMR spectra were recorded with a NOESYGPPR1D pulse sequence on a Bruker DRX 600 NMR spectrometer, equipped with a 5-mm SEI probe. Identification was confirmed by spiking with pure compounds obtained from Janssen Chimica and for quantification the internal standard 3-(Trimethylsilyl)propionic-2,2,3,3-d4 acid was used. The results are given in the table below.

The extracts were sensorially evaluated by an expert taste panel, comprised of six members experienced in evaluating umami ingredients. Samples of untreated, charcoal treated and charcoal+enzyme treated extracts from Folva potatoes were diluted two-fold, brought to pH 6.2 with 1M potassium hydroxide, and offered to the panelists in a blind fashion, the samples being coded with random three-digit numbers. Solutions of 0.5 and 2.0 g/L monosodium glutamate were used as reference.

All panelists indicated that the product of charcoal treatment largely lacked the intense bitterness and potato and rye flavour that was characteristic for the untreated extract.

Instead it was characterized by a sweet, salty and umami taste. The sample that was glutaminase treated before the charcoal treatment, according to consensus, was judged to have a markedly stronger savoury, salty and umami flavour, and a lower sweetness. Similar tasting results were obtained with the extracts obtained from the Belana potatoes, which had even lower off-flavour after charcoal treatment.

TABLE 1

Composition of extracts (mg/kg), before and after charcoal treatment and optional glutaminase treatment.

| | Folva | | | Belana | | |
|---|---|---|---|---|---|---|
| Compound | not treated | charcoal treated | charcoal enzyme treated | not treated | charcoal treated | charcoal enzyme treated |
| Alanine | n.d. | 58 | 58 | n.d. | 364 | 356 |
| Glycine | n.d. | 23 | 23 | n.d. | 36 | 35 |
| Valine | n.d. | 368 | 359 | n.d. | 480 | 487 |
| Leucine | n.d. | 81 | 81 | n.d. | 86 | 85 |
| Isoleucine | n.d. | 171 | 172 | n.d. | 183 | 185 |
| Proline | n.d. | 70 | 68 | n.d. | 104 | 103 |
| Methionine | n.d. | 117 | 122 | n.d. | 64 | 77 |
| Serine | n.d. | 153 | 151 | n.d. | 131 | 134 |
| Threonine | n.d. | 173 | 167 | n.d. | 211 | 190 |
| Phenylalanine | n.d. | 95 | 107 | n.d. | 157 | 168 |
| Asparagine | n.d. | 3878 | 3876 | n.d. | 3753 | 3737 |
| Glutamine | 1640* | 1435 | 0 | 1940* | 1866 | 177 |
| Aspartate | 650* | 611 | 611 | 190* | 202 | 231 |
| Glutamate | 380* | 372 | 1972 | 950* | 971 | 2835 |
| Lysine | n.d. | 286 | 286 | n.d. | 422 | 434 |
| Arginine | n.d. | 343 | 372 | n.d. | 606 | 621 |
| Histidine | n.d. | 72 | 78 | n.d. | 100 | 102 |
| Tyrosine | n.d. | 53 | 62 | n.d. | 124 | 139 |
| Glucose* | 5500 | 5190 | 5110 | 5480 | 5110 | 4990 |
| Fructose* | 5000 | 4730 | 4710 | 5140 | 4900 | 4380 |
| Sucrose* | 100 | 70 | 80 | 3450 | 3180 | 2930 |
| Citrate* | 3680 | 3280 | 3090 | 4510 | 4330 | 4190 |
| Malate* | 1400 | 1260 | 1230 | 1040 | 950 | 910 |
| Pyroglutamic acid* | 610 | 700 | 500 | 940 | 1050 | 970 |
| α-Solanine | 5.12 | <0.03 | <0.03 | 1.24 | <0.03 | <0.03 |
| Chaconine | 6.18 | <0.03 | <0.03 | 1.25 | <0.03 | <0.03 |
| Chlorogenic acid | 1.04 | <0.05 | <0.05 | 3.39 | <0.05 | <0.05 |
| Calcium | n.d. | 42 | 44 | n.d. | 34 | 33 |
| Potassium | n.d. | 4490 | 4450 | n.d. | 4680 | 4630 |
| Magnesium | n.d. | 270 | 270 | n.d. | 280 | 270 |
| Sodium | n.d. | 10 | 750 | n.d. | 36 | 790 |
| Phosphor | n.d. | 420 | 420 | n.d. | 450 | 440 |
| Dry Matter | 40000 | 35000 | 38000 | 46000 | 44000 | 46000 |
| N × 5.2** | n.d. | 8270 | 8740 | n.d. | 10300 | 10140 | n.d: not determined
*Based on NMR data
**Nitrogen content (Dumas) multiplied by 5.2 (multiplication factor is an approximation that is based on an estimate of the average nitrogen content of the free amino acids)

Example 2

Folva potatoes were peeled, grated using a kitchen food processor equipped with a grater disk, and subsequently ground with double-bladed knife for at least one minute at high speed. The potato slurry was filtered over a sintered glass funnel no. 2 under vacuum and the filtrate was boiled for at least 7 minutes in a pot. The precipitate formed during the heating was removed by a second filtration under vacuum, now using a Büchner funnel with a Whatman no. 595 filter paper. The filter cake was discarded and the filtrate was cooled with ice water.

200 mL of the second filtrate (extract A) was concentrated four-fold by means of rotary evaporation at 40° C. The resulting 50 mL of concentrate was applied on a 32×2.6 cm column filled with Amberlite FPX 66 (Dow Chemical), eluted with water at 10 mL/minute using an Äkta Explorer FPLC (Pharma Biotech, GE Healthcare Life Sciences). 200 mL of the eluate was collected and split in two subfractions.

To one subfraction (extract B) 0.2% glutaminase (SD-C100S from Amano) was added and the mixture was incubated for 30 minutes at 55° C. in a thermostated double-walled glass vessel. Subsequently the temperature of the solution was increased to 80° C. and kept at that temperature for 5 minutes to inactivate the enzyme, and afterwards cooled with ice water. The other subfraction (extract C) was subjected to the same temperature/time profile, but without addition of the enzyme preparation.

The major components in the extracts were quantified by NMR; glycoalkaloids and chlorogenic acid were determined with LC-MS and LC-UV, respectively. These methods are described in example 1.

The extracts were sensorially evaluated by an expert taste panel, comprised of three members experienced in evaluating umami ingredients. The products were diluted two-fold, brought to pH 6.2 with 1M potassium hydroxide, and offered to the panelists.

All panelists agreed that the product of the Amberlite elution (extract C) largely lacked the intense bitterness and potato and rye flavour that was characteristic for the untreated filtrate (extract A). The sample that was glutaminase treated after the Amberlite separation (extract B) was judged to have a markedly stronger savoury, salty and umami flavour than the non-enzymatically treated sample (extract C).

TABLE 2

Composition of extracts (mg/kg), before and after Amberlite separation and optional glutaminase treatment

| Compound | Extract A | Extract B | Extract C |
|---|---|---|---|
| Glucose* | 5470 | 4460 | 4420 |
| Fructose* | 4850 | 3910 | 3800 |
| Sucrose* | 460 | 330 | 320 |
| Citrate* | 4200 | 3430 | 3560 |
| Aspartate* | 550 | 450 | 460 |
| Glutamate* | 480 | 1410 | 430 |
| Glutamine* | 1190 | 0 | 870 |
| Malate* | 1370 | 1180 | 1190 |
| Pyroglutamic acid* | 400 | 310 | 390 |
| α-Solanine | 4.68 | <0.03 | <0.03 |
| Chaconine | 5.15 | <0.03 | <0.03 |
| Chlorogenic acid | 0.73 | <0.05 | <0.05 |
| Dry Matter | 38000 | 31000 | 33000 |

*Based on NMR data

Example 3

In a further quantitative evaluation a trained panel of ten subjects was used, which in a first step ranked five samples in order of increasing umami intensity, and in a second step rated the samples on a 15-points scale. The panel had been trained in ranking and scoring using aqueous monosodium glutamate solutions of different concentration.

The fractions derived from Folva potatoes, and described and characterized in example 1 (table 1), were diluted to the desired glutamate level. Where needed potassium citrate was added to the samples, including the MSG references, to bring it to 0.19%. Where needed fructose and glucose was added to standard levels of 0.18 and 0.28% respectively, and the pH was corrected to 6.2 with 1 M KOH.

The samples tested by the panel and the results so obtained are shown in Table 3. These results show that the fractions were scored higher on "umami" than expected on the basis of their glutamate concentrations.

TABLE 3

Umami intensity of Folva potato fractions, as scored by a trained panel

| Sample | MSG content [g/L]* | Average Score |
|---|---|---|
| Umami fraction | 0.24 | 5.1 |
| Enzyme treated umami fraction | 1.2 | 6.0 |
| Enzyme treated fraction (twofold diluted) | 0.6 | 5.1 |
| Monosodium glutamate reference | 2.0 | 4.8 |
| Monosodium glutamate reference | 0.5 | 3.2 |

*For the potato fractions: MSG-equivalents based on measured glutamate concentration

Example 4

The glutaminase-treated potato extract obtained from Belana potatoes described in example 1 was combined with a mixture of dry ingredients and hot water to produce a bouillon containing salt (7.5 g/L), yeast extract, spices and commercial chicken flavouring. The dosage of the potato extract was such that the glutamate content of the bouillon, expressed in MSG equivalents, was 1 g/L.

The bouillon was evaluated by a trained panel. The flavour of the bouillon containing the added potato extract was found to be considerably more umami and more intense than that of a blank bouillon to which no extract was added, and comparable to that of a bouillon to which 1 g/L MSG had been added instead of potato extract.

Example 5

115 g of the enzyme treated extract of Belana potatoes described in example 1 was freeze-dried. The freeze dried material so obtained was used to prepare flavored potato chips.

Unsalted potato chips (crisps), from a local Dutch supermarket were used as starting material. Four portions of 30 grams of unsalted potato crisps were heated in an oven at 120° C. for 12 minutes, following which different dry flavourings (reference, A, B and C) were added directly to the warm crisps. Care was taken to evenly distribute the flavouring powders over the crisps;

The compositions of the flavourings were as follows:
Reference: 0.45 g of table salt
Flavouring A: 0.45 g of table salt and 0.15 g of MSG
Flavouring B: 0.45 g table salt+0.91 g of a model mixture Flavouring C: 0.3 g table salt and 2.2 g of the freeze-dried extract.

The model mixture employed in Flavouring B contained 0.51 g sugars, 0.2 g potassium citrate, 0.15 g potassium glutamate, 0.04 g malic acid and some aspartic acid. These concentration levels corresponded to the levels of these components in Flavouring C.

In flavouring C the amount of added table salt was reduced to compensate for salt present in the freeze dried extract.

The flavoured crisps were evaluated by a small expert panel, consisting of four experienced tasters. The panel members scored the flavoured chips on each of the five basic tastes and on flavour intensity, using a four point scale (none-weak-medium-strong).

The chips prepared with Flavourings A, B and C were one-to-one compared with the chips that had been flavoured with table salt only (Reference). Panelists were also allowed to indicate differences noticed between samples.

The results of these evaluations are shown in Tables 4 and 5.

TABLE 4

Average sensory scores of different crisp variants

|  | Sweet | Salt | Sour | Umami | Bitter |
| --- | --- | --- | --- | --- | --- |
| Ref | 1.00 | 2.25 | 0.50 | 1.00 | 0.50 |
| Flavouring A | 1.00 | 2.38 | 0.50 | 1.38 | 0.25 |
| Flavouring B | 1.13 | 2.50 | 1.00 | 1.50 | 0.38 |
| Flavouring C | 1.38 | 2.75 | 0.75 | 1.88 | 0.88 |

TABLE 5

Comparison with Reference

Comments (made by at least 2 panel members)

| | |
| --- | --- |
| Flavouring A | Not very different from ref |
| Flavouring B | More intense, tickling on the tongue |
| Flavouring C | Most intense, strong savoury, tickling |

These results show that Flavouring C showed the highest scores on umami and, less markedly, on salt, even higher than Flavouring B, and clearly higher than FLavouring A.

Panelists also commented that Flavouring C had the highest flavour intensity and was most savoury. A slight increase in bitterness and sweetness, and a tickling sensation on the tongue were observed as well, but no clear off-notes.

The invention claimed is:

1. A composition with a dry matter content of at least 3 wt %, the dry matter content containing:
    150-900 g of proteinaceous matter per kg of dry matter, the proteinaceous matter comprising:
        at least 80 wt. % by weight of the proteinaceous matter being free amino acids comprising:
            a first group of free amino acids selected from asparagine (Asn), aspartate (Asp), glutamate (Glu), glutamine (Gln), pyroglutamate (pGlu) and combinations thereof, said first group of free amino acids comprising at least 3.5 wt. % Glu, calculated by weight of the free amino acids and said first group of free amino adds representing at least 45 wt. % of the free amino acids;
            a second group of free amino adds selected from glycine (Gly), leucine (Leu), lysine (Lys), serine (Ser), isoleucine (Ile) and combinations thereof;
        wherein the first group of free amino acids and the second group of free amino acids are present in a weight ratio of at least 4:1;
    and any remainder of the proteinaceous matter is selected from, oligopeptides, polypeptides and combinations thereof;
    0-100 g of starch per kg of dry matter;
    0-300 g of non-starch polysaccharides per kg of dry matter;
    0-330 g of saccharides selected from fructose, glucose, sucrose and combinations thereof per kg of dry matter;
    0.01-300 g of minerals selected from potassium, sodium, calcium, magnesium and combinations thereof per kg of dry matter;
    0-5 mg of chlorogenic acid per kg of dry matter; and
    0-30 mg of glycoalkaloid selected from a-solanine, a-chaconine and combinations thereof per kg of dry matter;
    wherein the dry matter is derived only from potato.

2. The composition according to claim 1, wherein said first group of free amino acids comprises at least 3.7 wt. % Glu.

3. The composition according to claim 1, wherein the composition contains less than 1 mg glycoalkaloid per g of glutamate.

4. The composition according to claim 1, wherein the any remainder of the proteinaceous matter comprises peptides comprising 2-20 amino acid residues represent less than 3% by weight of the proteinaceous matter.

5. The composition according to claim 1 wherein the ratio ([Glu]+[Gln]+[pGlu])/([Asp]+[Asn]) is the range of 1:4 to 3:1.

6. The composition according to claim 1, wherein pyroglutamate (pGiu) represents not more than 18% of the total amount of free amino acids.

7. The composition according to claim 1, wherein tyrosine (Tyr) is present in a concentration of at least 0.2% by weight of the total amount of free amino adds.

8. A process of preparing an edible product, said process comprising combining a composition according to claim 1 with one or more other edible ingredients to produce an edible product, wherein the composition contributes at least 50 mg of glutamate per kg of edible product.

9. Process according to claim 8, wherein the edible product is selected from condiments, sauces, soups, meat products, seasonings, bouillons and snacks.

10. An edible product obtained by the process according to claim 8.

11. A method of preparing the composition of claim 1 the method comprising the steps of:
    mechanically disintegrating potatoes to produce a potato slurry;
    removing pulp and starch granules from the potato slurry to produce a potato fruit juice;
    removing protein from the potato fruit juice to produce a deproteinated juice;
    contacting the deproteinated juice with a hydrophobic adsorbent;
    separating the deproteinated juice from the hydrophobic adsorbent;
    wherein the deproteinated juice is the flavour composition.

12. Method according to claim 11, wherein the hydrophobic adsorbent is activated carbon or a macroreticular aromatic polymer resin.

13. Method according to claim 11, wherein the pulp and starch granules are removed by sieving, filtration, sedimentation, decanting or centrifugation.

14. Method according to claim 11, wherein the protein is removed by ultrafiltration, chromatography or by acid- and/or heat-denaturation followed by removal of insolubles.

15. Method according to claim 11, comprising a step in which a source of glutaminase is added to convert glutamine to glutamate.

16. The composition of claim 1, wherein the composition is a food additive.

* * * * *